(12) United States Patent
Saikatsu et al.

(10) Patent No.: US 6,302,953 B1
(45) Date of Patent: *Oct. 16, 2001

(54) PIGMENT DISPERSIONS FOR COLOR FILTERS, FABRICATION PROCESS OF COLOR FILTERS, AND COLOR FILTERS

(75) Inventors: Hiroaki Saikatsu; Hisao Okamoto; Shigeru Sakamoto; Mitsuo Yamazaki; Tetsuo Fukuda; Shiro Yamamiya; Yoshio Abe; Michiei Nakamura, all of Tokyo (JP)

(73) Assignee: Dainichiseika Color Chemicals Mfg. Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/471,475

(22) Filed: Dec. 23, 1999

(30) Foreign Application Priority Data

Dec. 28, 1998 (JP) .................................... 10-371915

(51) Int. Cl.$^7$ ............................ C07D 251/00; G02B 5/20
(52) U.S. Cl. ........................... 106/498; 430/7; 524/100; 544/187; 544/188
(58) Field of Search ................... 106/498; 430/7, 430/322; 544/187, 188; 524/100; 359/891

(56) References Cited

U.S. PATENT DOCUMENTS

| | | | |
|---|---|---|---|
| 3,262,933 | * 7/1966 | Mix et al. | 544/187 |
| 3,282,940 | * 11/1966 | Weber et al. | 544/187 |
| 3,297,695 | * 1/1967 | Weidinger et al. | 544/187 |
| 3,300,491 | * 1/1967 | Jenny et al. | 544/187 |
| 3,349,089 | * 10/1967 | Kazaankov et al. | 544/187 |
| 3,470,178 | * 9/1969 | Neef et al. | 544/187 |
| 3,488,349 | * 1/1970 | Neef | 544/187 |
| 3,684,808 | * 8/1972 | Ulrich | 544/187 |
| 4,098,793 | * 7/1978 | Ribaldone et al. | 548/134 |
| 4,442,287 | * 4/1984 | Hartwig et al. | 544/187 |
| 5,368,976 | * 11/1994 | Tajima et al. | 430/176 |
| 5,731,110 | * 3/1998 | Hishiro et al. | 430/7 |
| 5,811,219 | * 9/1998 | No et al. | 430/287.1 |
| 5,827,626 | * 10/1998 | Kobayashi et al. | 430/7 |
| 5,853,924 | * 12/1998 | Uwami et al. | 430/7 |
| 5,863,678 | * 1/1999 | Urano et al. | 430/7 |
| 5,961,711 | 10/1999 | Saikatsu et al. | 106/498 |

* cited by examiner

Primary Examiner—Anthony Green
(74) Attorney, Agent, or Firm—Oblon, Spivak, McClelland, Maier & Neustadt, P.C.

(57) ABSTRACT

Pigment dispersions for color filters are composed of pigments, dispersants, film-forming resins and liquid media. The dispersants comprises compounds represented by the following formula (I):

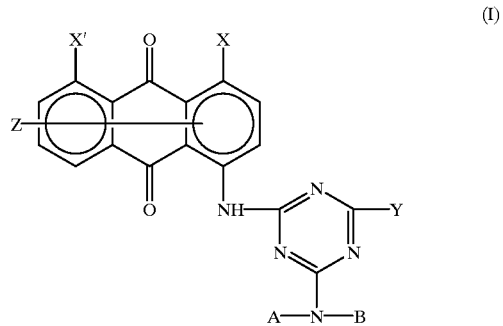

wherein X and X' each independently represent H, OH, alkoxy, primary, secondary or tertiary amino, or acylamino; Y represents an anthraquinonylamino, phenylamino or phenoxy group having H, OH, alkoxy, primary, secondary or tertiary amino, or acylamino at the 4-position or 5-position; A and B each independently represent alkyl, cycloalkyl or aryl, and at least one of A and B has at least one substituent group containing a basic nitrogen atom; and Z represents H, CN, halogen, alkyl, alkoxy, $NO_2$, benzoylamino or 3-benzoyl, and the 3-benzoyl group may be fused together with X to form an acridone ring. These pigment dispersions are useful for the production of color filters.

13 Claims, No Drawings

PIGMENT DISPERSIONS FOR COLOR FILTERS, FABRICATION PROCESS OF COLOR FILTERS, AND COLOR FILTERS

BACKGROUND OF THE INVENTION a) Field of the Invention

This invention relates to pigment dispersions for the production of color filters (hereinafter called "pigment dispersions for color filters"), which are excellent in fluidity, storage stability, dispersion stability, and the like.

b) Description of the Related Art

A color filter, which is useful for the production of a liquid crystal color display, an image pickup device or the like, has conventionally been produced primarily by spin-coating a color filter substrate with a pigment dispersion for a color filter—said pigment dispersion containing pigments of three colors, that is, red (R), green (G) and blue (B) dispersed in a solution of a photosensitive resin—to form a color film, exposing the color film to light through a photomask, and then developing the exposed color film to form the color film into a pattern so that desired pixels are formed on the color filter substrate.

As primary pigments for use in the production of color filters, phthalocyanine green, for example, C.I. pigment green (hereinafter called "P.G.") 36 is generally used as a green color, anthraquinone red, for example, C.I. pigment red (hereinafter called "P.R.") 177 is generally employed as a red color, and phthalocyanine blue, for example, C.I. pigment blue (hereinafter called "P.B.") 15:6 is generally used as a blue color. There are however differences between the hues of these pigments and color characteristics required for liquid crystal displays. For a green pigment and a red pigment, a yellow pigment is therefore used in combination in a small amount as a complementary color, and for a blue pigment, a purple pigment is also used in combination in a small amount as a complementary color.

A pigment dispersion for a color filter is generally composed of a pigment, a dispersant, a film-forming resin and a liquid medium. As the film-forming resin, an acrylic resin having an acid value high enough to permit development with an aqueous alkaline solution after the formation of a film is mainly adopted. However, a pigment dispersion formed of the above-described conventional pigment and the acrylic resin of the high acid value has poor storage stability in many instances. Flocculation of the pigment therefore takes place so that the viscosity of the pigment dispersion tends to become higher with time.

When a color filter is produced by using the pigment dispersion accompanied by such difficulties as described above, the pigment dispersion is coated on a color filter substrate by spin-coating. If the viscosity of the pigment dispersion is high or if pigment particles in the dispersion undergo flocculation and the pigment dispersion exhibits thixotropic viscosity, The pigment dispersion so coated becomes thicker around a central portion of the substrate. This leads to occurrence of unevenness in color hue and a difference in color density between the resulting color film at the central part of the substrate and that at a peripheral part of the substrate upon production of a large-screen color filter.

Accordingly, a pigment dispersion for a color filter must be in such a stable dispersion state of the pigment as being free from mutual flocculation of its pigment particles and must have a low viscosity of from 5 to 20 centipoises viscosity and excellent storage stability, despite its pigment content is generally in a range of from 5 to 10 wt. %. With a view to meeting performance requirements for such pigment dispersions for color filters, a variety of dispersants are disclosed in JP 60-237403 A and JP 60-247603 A. Pigment dispersions making use of these pigment dispersants (hereinafter simply called "dispersants") are accompanied by a drawback in that they show neither sufficiently low viscosity nor sufficiently high dispersion stability and also by another drawback in that the maximum absorption wavelengths at RGB pixels in color filters produced from these pigment dispersions are caused to shift toward a lower wavelength side or a shorter wavelength side, thereby lowering their color quality as color filters for liquid crystal displays.

SUMMARY OF THE INVENTION

To develop a dispersant capable of solving the above-described drawbacks of the conventional dispersants and also of permitting formulation of a pigment dispersion for a color filter, said pigment dispersion being provided with improved color quality and lowered viscosity, the present inventors have proceeded with an extensive investigation. As a result, it has been found that particular derivatives of triazinylaminoanthraquinone dyestuff commonly act as excellent dispersants for a phthalocyanine blue as a primary pigment for a blue color and a purple pigment as a complementary pigment therefor, an anthraquinone red (P.R. 177) and pyrrolopyrrole pigments (P.R. 254, P.O. 71) and a yellow pigment as a complementary pigment therefor, and a phthalocyanine green (P.G. 36) as a primary pigment for a green color and a yellow color as a complementary pigment therefor and can achieve reductions in the viscosities of pigment dispersions. It has also been found that the resultant pigment dispersions can be prevented from thickening and gelatinization during storage and have been improved in clarity, a most important property for color filters. These findings have led to the completion of the present invention.

The present invention therefore provides a pigment dispersion for a color filter, said pigment dispersion being composed of a pigment, a dispersant, a film-forming resin and a liquid medium, wherein said dispersant comprises a compound represented by the following formula (I):

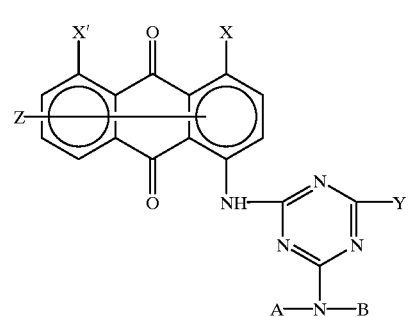

(I)

wherein X and X' each independently represent a hydrogen atom, a hydroxyl group, an alkoxy group, a primary, secondary or tertiary amino group, or an acylamino group; Y represents an anthraquinonylamino, phenylamino or phenoxy group having a hydrogen atom, a hydroxyl group, an alkoxy group, a primary, secondary or tertiary amino group, or an acylamino group at the 4-position or 5-position thereof; A and B each independently represent an alkyl group, a cycloalkyl group or an aryl group, and at least one of A and B has at least one substituent group containing a basic nitrogen atom; and Z represents a hydrogen atom, a cyano group, a halogen atom, an alkyl group, an alkoxy group, a nitro group, a benzoylamino group or a 3-benzoyl group, and said 3-benzoyl group may be fused together with X to form an acridone ring.

The term "at least one substituent group containing a basic nitrogen atom" as used herein may mean a primary, secondary or tertiary amino group, a quaternary ammonium group or a pyridinium group, with a tertiary amino group being particularly preferred.

The pigment dispersion according to the present invention for the color filter is characterized in the use of the particular derivative of the triazinylamino-anthraquinone dyestuff as the dispersant for the pigment. Owing to the use of the dispersant, flocculation of particles of the pigment in the pigment dispersion for the color filter can be prevented. As a consequence, the pigment dispersion for the color filter has been lowered in structural viscosity, and has a low viscosity. The pigment dispersion is prevented from thickening and gelatinization, and is provided with increased storage stability. Further, the dispersant represented by the formula (I) has by itself a color tone of yellowish red-bluish red-blue. When this dispersant is used as a dispersant for a blue pigment and a purple pigment as a complementary color pigment for the blue pigment, a green pigment and a yellow pigment as a complementary color pigment for the green pigment, and a red pigment and a yellow pigment as a complementary color pigment for the red pigment, respectively, and the resulting pigment dispersions are used for the formation of pixels of color filters in a liquid crystal color display or the like, the pixels can be formed with desired color quality.

According to the present invention, the use of the specific dispersant makes it possible to prepare the pigment dispersion stably. Further, eventual use of the pigment dispersion as a pigment dispersion for a color filter results in a color film excellent in spectral curve characteristics, high in vividness and brightness, high in clarity, and also superb in various fastness such as light fastness, heat resistance, solvent resistance, chemical resistance and waterproofness. Therefore, color filters can be obtained with these excellent characteristics.

DETAILED DESCRIPTION OF THE INVENTION AND PREFERRED EMBODIMENTS

The present invention will next be described in further detail based on certain preferred embodiments. The dispersant represented by the formula (I), which is useful in the present invention, can be prepared by the preparation process disclosed, for example, in JP 46-33232 B, JP 46-33233 B or JP 46-34518 B or a process similar to the preparation process. As an example, a dispersant can be obtained by reacting 1 mole of 1-amino-5-benzoylaminoanthraquinone, 1 mole of aniline or phenol and 1 mole of cyanuric chloride at 130 to 160° C. for 2 to 6 hours in an inert solvent such as o-dichlorobenzene, adding 1 mole of a polyamine containing at least one secondary amino group and at least one tertiary amino group and containing no primary amino group, and then reacting them at 150 to 170° C. for 3 to 4 hours.

Illustrative of the "polyamine containing at least one secondary amino group and at least one tertiary amino group and containing no primary amino group" employed in the above-described process are:
N,N,N'-trimethyl-ethylenediamine,
N,N-dimethyl-N'-ethyl-ethylenediamine,
N,N-diethyl-N'-methyl-ethylenediamine,
N,N-dimethyl-N'-ethyl-propylenediamine,
N,N,N'-trimethyl-propylenediamine,
N,N,N'-triethyl-propylenediamine,
N,N,N'-trimethyl-hexamethylenediamine,
N,N-diethyl-N'-methyl-p-phenylenediamine,
N,N-dipropyl-N'-methyl-p-phenylenediamine,
N,N,N'-trimethyl-p-phenylenediamine,
N,N,N'-trimethyl-m-phenylenediamine,
N,N,N'-triethyl-p-phenylenediamine,
N,N-diethyl-N'-methyl-1,4-diaminocyclohexane,
N,N-diethyl-N'-methyl-1,3-diaminocyclohexane,
N,N,N'-trimethyl-1,4-diaminocyclohexane,
N,N,N'-triethyl-1,4-diaminocyclohexane,
N-methylpiperazine,
N-ethylpiperazine,
N-isobutylpiperazine,
2-chlorophenylpiperazine,
N-(2-pyridyl)piperazine,
N-(4-pyridyl)piperazine, and
Methylhomopiperazine.

In addition to the above-described compounds, particularly preferred can include:
N,N,N",N"-tetramethyldiethylenetriamine,
N,N,N",N"-tetra(n-propyl)diethylenetriamine,
N,N,N",N"-tetra(i-propyl)diethylenetriamine,
N,N,N",N"-tetra(n-butyl)diethylenetriamine,
N,N,N",N"-tetra(i-butyl)diethylenetriamine,
N,N,N",N"-tetra(s-butyl)diethylenetriamine,
N,N,N",N"-tetra(t-butyl)diethylenetriamine,
3,3'-iminobis(N,N-dimethylpropylamine),
3,3'-iminobis(N,N-diethylpropylamine),
3,3'-iminobis[N,N-di(n-propyl)propylamine],
3,3'-iminobis[N,N-di(i-propyl)propylamine],
3,3'-iminobis[N,N-di(n-butyl)propylamine],
3,3'-iminobis[N,N-di(i-butyl)propylamine],
3,3'-iminobis[N,N-di(s-butyl)propylamine],
3,3'-iminobis[N,N-di(t-butyl)propylamine],
4,4'-iminobis(N,N-dimethylbutylamine),
4,4'-iminobis(N,N-diethylbutylamine),
2,9-dimethyl-2,5,9-triazadecane,
2,12-dimethyl-2,6,12-triazatridecane,
2,12-dimethyl-2,5,12-triazatridecane,
2,16-dimethyl-2,9,16-triazaheptadecane,
3-ethyl-10-methyl-3,6,10-triazaundecane,
5,13-di(n-butyl)-5,9,13-triazaheptadecane,
2,2'-dipicolylamine, and
3,3'-dipicolylamine.

Among the dispersants according to the present invention available by the above-described processes, preferred dispersants are compounds represented by the following formula (1), more preferred dispersants are compounds represented by the formula (2), and particularly preferred dispersants are compounds represented by the following formula (3):

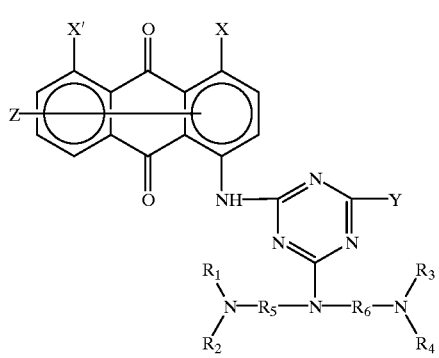

(1)

wherein X, X', Y and Z have the same meanings as defined above; $R_1$ to $R_4$ may be the same or different and each independently represent a substituted or unsubstituted alkyl or cycloalkyl group, and $R_1$ and $R_2$ and/or $R_3$ and $R_4$ may be fused together with the adjacent nitrogen atom thereof to form a heterocyclic ring which may additionally contain a further nitrogen atom, an oxygen atom or a sulfur atom; and $R_5$ and $R_6$ each independently represent an alkylene group, a cycloalkylene group or an arylene group.

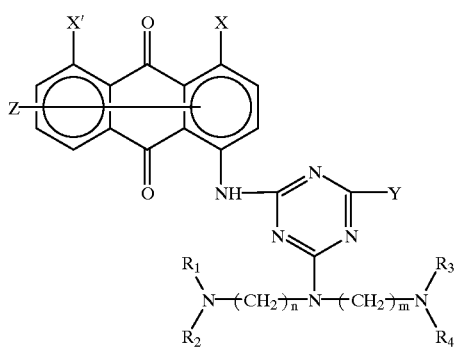

(2)

wherein X, X', Y, Z and $R_1$ to $R_4$ have the same meanings as defined above; and n and m each independently stand for an integer of from 2 to 30.

Incidentally, the aminoacyl groups in the above-described formula (I) and the above-described formulas (1) to (2), are groups represented by —NHCOR, in which R is a phenyl group, a methyl group, an ethyl group, a propyl group, a butyl group, or the like.

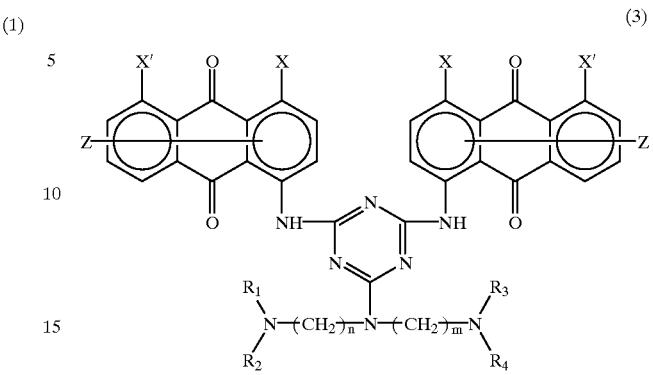

(3)

wherein X and X' each independently represent a hydrogen atom or a benzoylamino group; Z represents a hydrogen atom; $R_1$ to $R_4$ may be the same or different and each independently represent a methyl group or an ethyl group; and n and m each independently stand for 2 or 3.

Specific examples of preferred dispersants in the present invention can include, but are not limited to, the followings in which X represents a benzoylamino group:

Specific Example 1

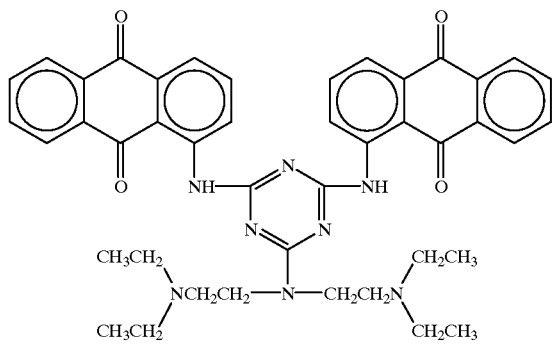

Specific Example 2

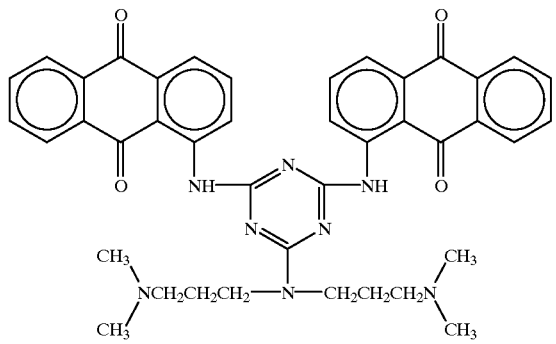

Specific Example 3
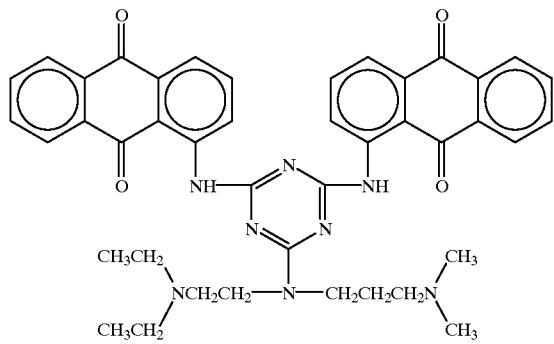
Specific Example 6
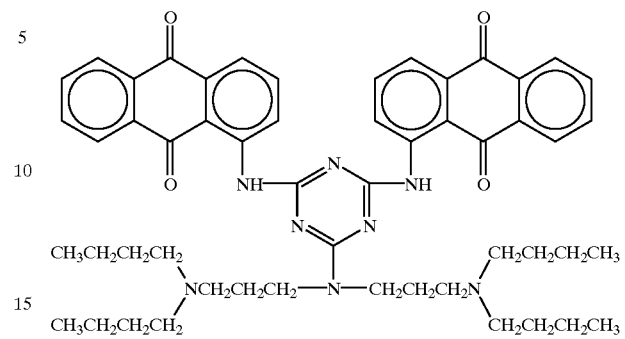
Specific Example 4
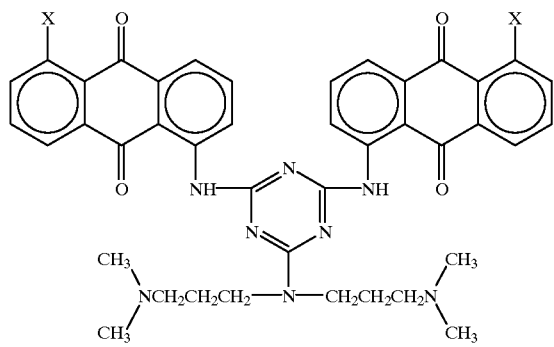
Specific Example 7
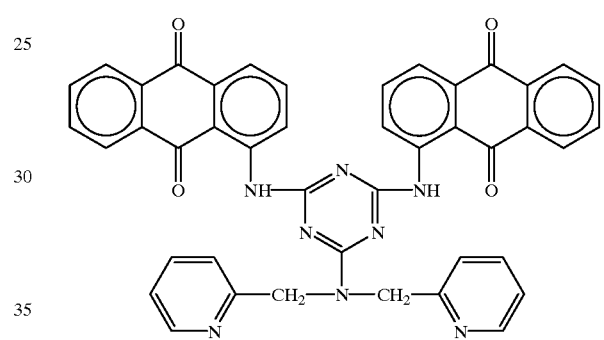
Specific Example 5
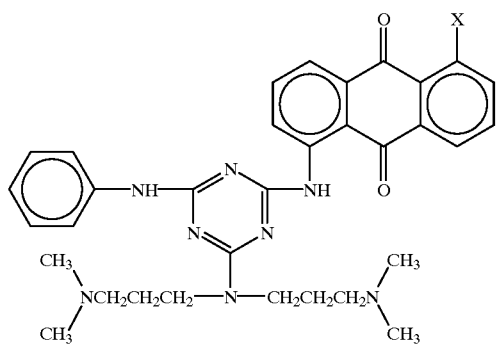
Specific Example 8
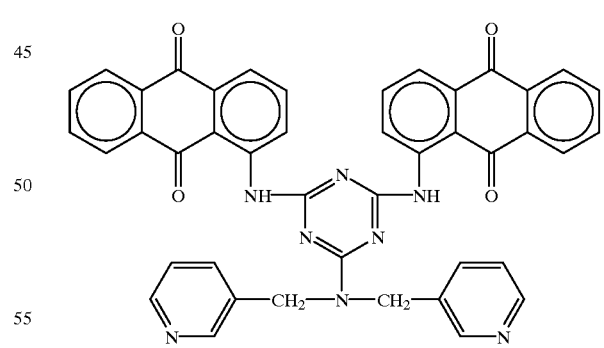

Specific Example 9
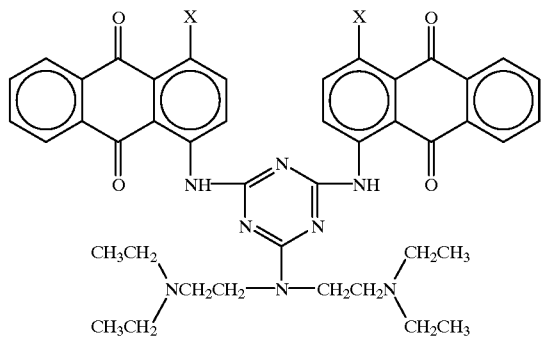
Specific Example 12
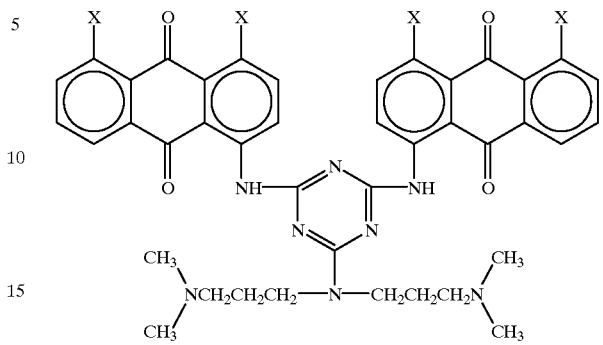
Specific Example 10
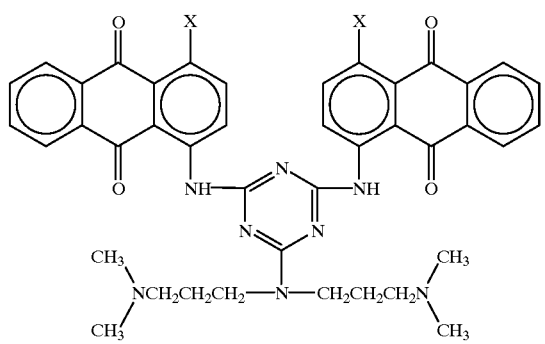
Specific Example 13
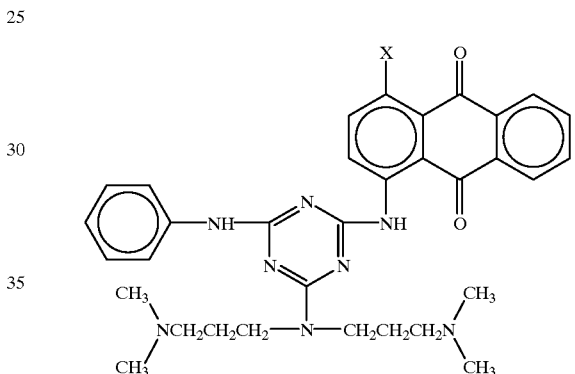
Specific Example 11
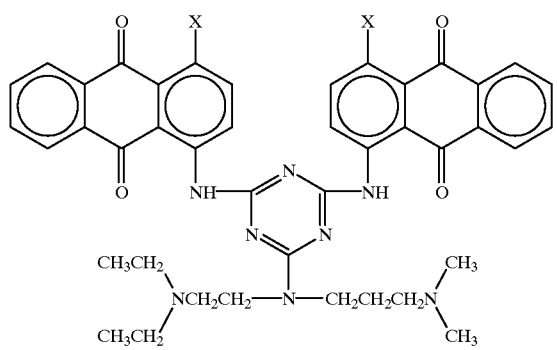
Specific Example 14
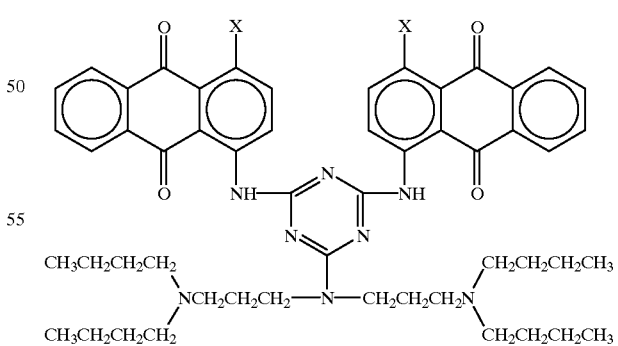

Specific Example 15
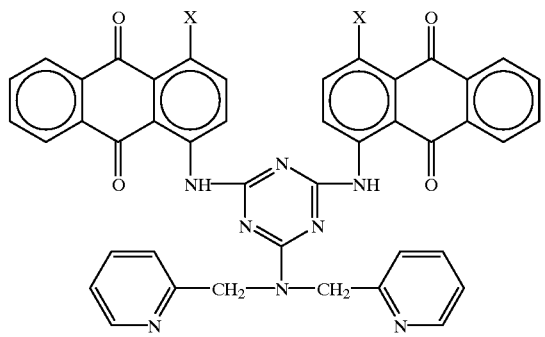
Specific Example 17
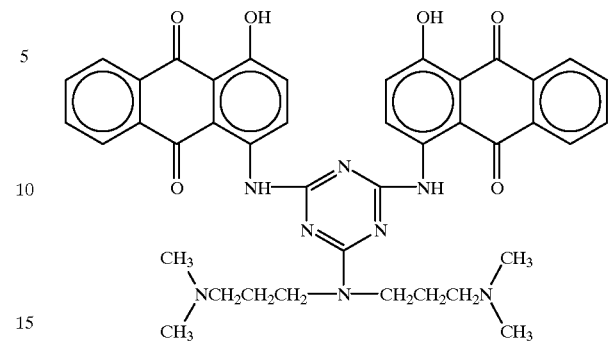
Specific Example 16
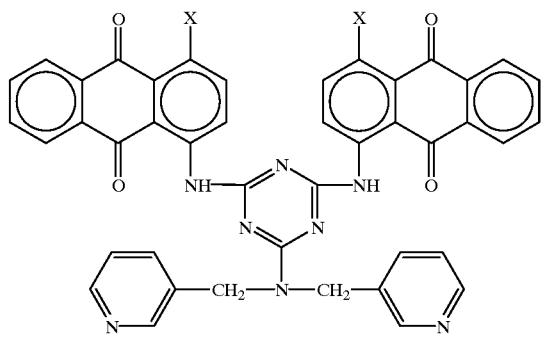
Specific Example 18
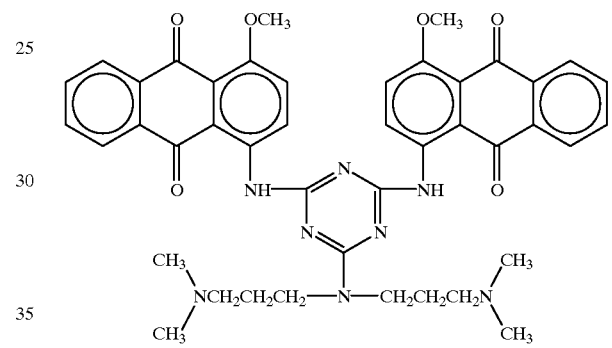
Specific Example 19
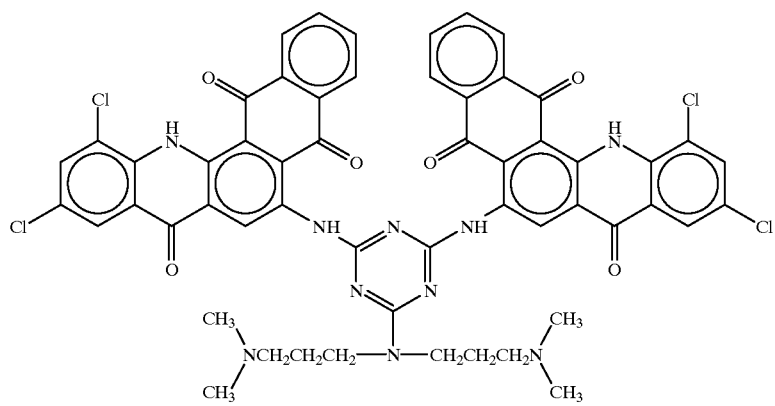

and the quaternary ammonium compounds of Specific Examples 1–6, 9–14 and 17–19 and the pyridinium compounds of Specific Examples 7–8 and 15–16.

The pigment dispersion according to the present invention for the color filter is formed of the dispersant, the pigment, the film-forming resin, and the liquid medium. To prepare the pigment dispersion according to the present invention for the color filter, the above-described pigment dispersant is used in a proportion of from 0.5 to 50 parts by weight, preferably from 1 to 30 parts by weight per 100 parts by weight of the pigment. The effects of the dispersant for use in the present invention are not recognized practically if it is used in an amount smaller than 0.5 part by weight, but, even if it is used in an amount greater than 50 parts by weight, its effects cannot be brought about as much as the amount used.

Examples of pigments suitably usable in the pigment dispersion according to the present invention for the color filter can include C.I. pigment red (hereinafter abbreviated as "P.R.") 177, P.R. 254, P.R. 242, P.R. 209, P.R. 224; C.I. pigment green (hereinafter abbreviated as "P.G.") 36, P.G. 7; C.I. pigment blue (hereinafter abbreviated as "P.B.") 15:6, P.B. 60; C.I. pigment yellow (hereinafter abbreviated as "P.Y.") 138, P.Y. 185, P.Y. 150, P.Y. 139, P.Y. 83; C.I. pigment violet (hereinafter abbreviated as "P.V.") 23; C.I. pigment black (hereinafter abbreviated as "P.BL." 6, P.BL. 7. To eliminate or reduce a difference between the color hue of one of these pigments and color characteristics required for a liquid crystal color display, the pigment may be used as an appropriate mixture with one or more of the remaining pigments.

As a method for preparing the pigment dispersion according to the present invention for the color filter, the pigment and the dispersant are added in and premixed with an organic solvent solution or aqueous solution in which an appropriate film-forming resin is contained, and the pigment is then dispersed. For example, the pigment and dispersant are evenly mixed and ground in a disperser such as a horizontal disperser with tumbling medium contained therein, a vertical disperser with tumbling medium contained therein, a pin mill, an attritor or a ball mill. The mixture so obtained is thereafter added in and mixed with a solution in which the film-forming resin is contained. As an alternative, the pigment is uniformly suspended in water or an organic solvent. A solution with the dispersant contained therein is added to and mixed with the suspension. Pigment particles with the dispersant adsorbed thereon is added in and mixed with a solution in which the film-forming resin is contained. As another alternative, the pigment and dispersant are dissolved in sulfuric acid or the like and subsequent to that, the sulfuric acid solution is caused to crystallize in water to separate them as a solid solution. The solid solution is added in and mixed with a solution in which the film-forming resin is contained.

As the solution in which the film-forming resin is contained for dispersing the pigment into the pigment dispersion in the present invention, a solution with the film-forming resin contained therein, said solution being used in conventionally-known pigment dispersions for color filters, can be used. As the liquid medium, an organic solvent, water, or a mixture of an organic solvent and water is used. Illustrative of the organic solvent are ethylene glycol monomethyl ether, ethylene glycol monoethyl ether, ethylene glycol monomethyl ether acetate, ethylene glycol monoethyl ether acetate, propylene glycol monomethyl ether, propylene glycol monoethyl ether, propylene glycol monomethyl ether acetate, propylene glycol monoethyl ether acetate, 3-methoxybutylacetate, cyclohexanone, and ethyl lactate. Further, conventionally-known additives, for example, additives such as a dispersing aid, a smoothing agent and an adhering agent can be added to the pigment dispersion. The proportion of the pigment relative to the film-forming resin in the solution in which the film-forming resin is contained may preferably be in a range of from 5 parts by weight to 500 parts by weight per 100 parts by weight of the film-forming resin.

As the solution with the film-forming resin contained therein, either a solution with a photosensitive film-forming resin contained therein or a solution with a non-photosensitive film-forming resin contained therein can be used. Examples of the solution with the photosensitive film-forming resin contained therein can include solutions in which photosensitive film-forming resins usable in ultraviolet curing inks and electron radiation curing inks are contained. Illustrative of the solution with the non-photosensitive film-forming resin contained therein can be varnishes for use in printing inks such as letterpress inks, lithographic inks, intaglio gravure inks and stencil screen inks, varnishes for use in electrodeposition coating, varnishes for use in toners for electronic printing and electrostatic printing, and varnishes for use in thermal transfer ribbons.

Illustrative photosensitive film-forming resins can include photosensitive resins such as photosensitive cyclizing rubber resins, photosensitive phenol resins, photosensitive polyacrylate resins, photosensitive polyamide resins, photosensitive polyimide resins, unsaturated polyester resins, polyester acrylate resins, polyepoxy acrylate resins, polyurethane acrylate resins, polyether acrylate resins and polyol acrylate resins. These resins can be used either singly or in combination. Preferred resins out of the above-described photosensitive film-forming resins are alkali-developable acrylate resins each of which contains free carboxylic radicals in its molecule. Further, various monomers can also be added as reactive extenders to solutions which contain these photosensitive film-forming resins.

Further, a photo-curing, photosensitive pigment dispersion can be formed by adding a photopolymerization initiator such as benzoin ether or benzophenone to a pigment dispersion with a photosensitive resin contained therein and then kneading the resultant mixture by a conventionally-known method. A heat-curing pigment dispersion can also be obtained by using a thermal polymerization initiator instead of the above-mentioned photopolymerization initiator.

To form a color filter pattern with the above-described photosensitive pigment dispersion, it is necessary to conduct full coating on a transparent color filter substrate such as a glass substrate with the photosensitive pigment dispersion by means of a spin coater, low-speed rotating coater, roll coater, knife coater or the like or as an alternative, to perform full printing or partial printing for a size somewhat greater than the pattern by one of various printing methods. Subsequent to provisional drying, a photomask is brought into close contact with the coated surface or the printed surface, which is then subjected to exposure by using an extra-high pressure mercury vapor lamp to bake the pattern. Development and washing are then conducted and if necessary, post-baking is performed, whereby the color filter pattern can be formed.

Examples of the non-photosensitive film-forming resin can include cellulose acetate resins, nitrocellulose resins, styrene (co)polymers, polyvinyl butyral resins, aminoalkyd resins, polyester resins, amino-resin-modified polyester resins, polyurethane resins, acrylic polyolurethane resins, soluble polyamide resins, soluble polyimide resins, soluble polyamideimide resins, soluble polyester-imide resins, casein, hydroxyethylcellulose, water-soluble salts of styrene-maleic acid ester copolymers, water-soluble (meth) acrylic acid ester (co)polymers, water-soluble aminoalkyd resins, water-soluble aminopolyester resins, and water-soluble polyamide resins. These resins can be used either singly or in combination.

To form a color filter patter with the above-described non-photosensitive pigment dispersion, a few methods can be mentioned by way of example. Namely, the color pattern can be printed directed on a similar color filter substrate with the above-described non-photosensitive pigment dispersion, for example, a printing ink for the color filter by one of the above-described various printing methods. The color pattern can also be formed on the substrate with a water-base, electrodeposition coating formulation for the color filter. It is also possible to form the color pattern on a transfer base material beforehand by electron printing, electrostatic printing, one of the above-described methods or the like and then to transfer the color pattern onto a color filter substrate. Baking, surface-smoothing grinding and/or surface-protecting top coating are then conducted, as needed, by conventional methods. It is also possible to obtain an RGB color filter by forming a black matrix in a conventional manner.

The present invention will next be described more specifically by Examples and Comparative Examples, in which the designations of "part" or "parts" and "%" are all by weight.

Synthesis Example 1

Added to 600 parts of o-dichlorobenzene were 62 parts of 1-aminoanthraquinone and 25 parts of cyanuric chloride, followed by stirring at 130° C. for 5 hours. After cooling, 50 parts of N,N,N",N"-tetraethyldiethylenetriamine were added further, and the resultant mixture was stirred at 170° C. for 3 hours. Subsequent to filtration, the thus-obtained filtercake was washed with ethanol and then dried, whereby the above-described specific example (1) was obtained as Dispersant 1.

Synthesis Example 2

In a similar manner as in Synthesis Example 1, the above-described specific example (2) was obtained as Dispersant 2 by successively subjecting 1-aminoanthraquinone and 3,3'-iminobis(N,N-dimethylpropylamine) to condensation reactions with cyanuric chloride.

Synthesis Example 3

In a similar manner as in Synthesis Example 1, the above-described specific example (3) was obtained as Dispersant 3 by successively subjecting 1-aminoanthraquinone and 3-ethyl-10-methyl-3,6,10-triazaundecane to condensation reactions with cyanuric chloride.

Synthesis Example 4

In a similar manner as in Synthesis Example 1, the above-described specific example (4) was obtained as Dispersant 4 by successively subjecting 1-amino-5-benzoylaminoanthraquinone and 3,3'-iminobis(N,N-dimethylpropylamine) to condensation reactions with cyanuric chloride.

Synthesis Example 5

In a similar manner as in Synthesis Example 1, the above-described specific example (5) was obtained as Dispersant 5 by successively subjecting 1-amino-5-benzoylaminoanthraquinone, aniline and 3,3'-imino-bis(N,N-dimethylpropylamine) to condensation reactions with cyanuric chloride.

Synthesis Example 6

In a similar manner as in Synthesis Example 1, the above-described specific example (6) was obtained as Dispersant 6 by successively subjecting 1-aminoanthraquinone and 5,13-di(n-butyl)-5,9,13-triazaheptadecane to condensation reactions with cyanuric chloride.

Synthesis Example 7

In a similar manner as in Synthesis Example 1, the above-described specific example (7) was obtained as Dispersant 7 by successively subjecting 1-aminoanthraquinone and 2,2'-dipicolylamine to condensation reactions with cyanuric chloride.

Synthesis Example 8

In a similar manner as in Synthesis Example 1, the above-described specific example (8) was obtained as Dispersant 8 by successively subjecting 1-aminoanthraquinone and 3,3'-dipicolylamine to condensation reactions with cyanuric chloride.

Synthesis Example 9

In a similar manner as in Synthesis Example 1, the above-described specific example (9) was obtained as Dispersant 9 by successively subjecting 1-amino-4-benzoylaminoanthraquinone and N,N",N"-tetraethyldiethylenetriamine to condensation reactions with cyanuric chloride.

Synthesis Example 10

In a similar manner as in Synthesis Example 1, the above-described specific example (10) was obtained as Dispersant 10 by successively subjecting 1-amino-4-benzoylaminoanthraquinone and 3,3'-iminobis(N,N-dimethylpropylamine) to condensation reactions with cyanuric chloride.

Synthesis Example 11

In a similar manner as in Synthesis Example 1, the above-described specific example (11) was obtained as Dispersant 11 by successively subjecting 1-amino-4-benzoylaminoanthraquinone and 3-ethyl-10-methyl-3,6,10-triazaundecane to condensation reactions with cyanuric chloride.

Synthesis Example 12

In a similar manner as in Synthesis Example 1, the above-described specific example (12) was obtained as Dispersant 12 by successively subjecting 1-amino-4,5-dibenzoylaminoanthraquinone and 3,3'-iminobis(N,N-dimethylpropylamine) to condensation reactions with cyanuric chloride.

Synthesis Example 13

In a similar manner as in Synthesis Example 1, the above-described specific example (13) was obtained as Dispersant 13 by successively subjecting 1-amino-4-benzoylaminoanthraquinone, aniline and 3,3'-imino-bis(N, N-dimethylpropylamine) to condensation reactions with cyanuric chloride.

Synthesis Example 14

In a similar manner as in Synthesis Example 1, the above-described specific example (14) was obtained as Dispersant 14 by successively subjecting 1-amino-4-benzoylaminoanthraquinone and 5,13-di(n-butyl)-5,9,13-triazaheptadecane to condensation reactions with cyanuric chloride.

Synthesis Example 15

In a similar manner as in Synthesis Example 1, the above-described specific example (15) was obtained as Dispersant 15 by successively subjecting 1-amino-4-benzoylaminoanthraquinone and 2,2'-dipicolylamine to condensation reactions with cyanuric chloride.

Synthesis Example 16

In a similar manner as in Synthesis Example 1, the above-described specific example (16) was obtained as Dispersant 16 by successively subjecting 1-amino-4-benzoylaminoanthraquinone and 3,3'-dipicolylamine to condensation reactions with cyanuric chloride.

Synthesis Example 17

In a similar manner as in Synthesis Example 1, the above-described specific example (17) was obtained as Dispersant 17 by successively subjecting 1-amino-4-hydroxyanthraquinone and 3,3'-iminobis(N,N-dimethylpropylamine) to condensation reactions with cyanuric chloride.

Synthesis Example 18

In a similar manner as in Synthesis Example 1, the above-described specific example (18) was obtained as Dispersant 18 by successively subjecting 1-amino-4-methoxyanthraquinone and 3,3'-iminobis(N,N-dimethylpropylamine) to condensation reactions with cyanuric chloride.

Synthesis Example 19

In a similar manner as in Synthesis Example 1, the above-described specific example (19) was obtained as Dispersant 19 by successively subjecting 1-aminoacridone-1,2(2',4'-dichloro)acridone and 3,3'-imino-bis(N,N-dimethylpropylamine) to condensation reactions with cyanuric chloride.

EXAMPLE 1

The phthalocyanine green (P.G. 36), Dispersant 1 and a solvent (propylene glycol monomethyl ether acetate; hereinafter abbreviated as "PGMAc") were added to an acrylic resin (obtained by polymerizing methacrylic acid, butyl acrylate, styrene and hydroxyethyl acrylate at a molar ratio of 25/50/15/10; molecular weight: 12,000; solid content: 30%) as shown below in Table 1. Subsequent to premixing, the resultant mixture was dispersed in a horizontal beads mill, whereby a green base color was obtained.

EXAMPLES 2–3

In accordance with the corresponding compositions shown below in Table 1, two green base colors were obtained in a similar manner as in Example 1 except that Dispersants 2–3 were used in place of Dispersant 1, respectively.

EXAMPLES 4–7

Four red base colors were obtained by similar procedures as in Example 1 except that the anthraquinonyl red (P.R. 177) was used instead of the phthalocyanine green and Dispersant 4–7 were used as dispersants, respectively. Their compositions are shown in Table 1.

EXAMPLES 8–10

Yellow base colors were obtained by similar procedures as in Example 1 except that a yellow pigment, isoindoline (P.Y. 139), was used instead of the phthalocyanine green and Dispersant 8,1,2 were used as dispersants, respectively. Their compositions are shown in Table 1.

Comparative Example 1

In accordance with the corresponding composition shown below in Table 1, a green base color was obtained in a similar manner as in Example 1 except that a commercial dispersant (hereinafter abbreviated as "BD"), which is a derivative of a blue pigment, was used.

Comparative Example 2

In accordance with the corresponding composition shown below in Table 1, a red base color was obtained in a similar manner as in Example 4 except that a commercial dispersant (hereinafter abbreviated as "YD"), which is a derivative of a yellow pigment, was used.

Comparative Example 3

In accordance with the corresponding composition shown below in Table 1, a yellow base color was obtained in a similar manner as in Example 8 except that the commercial dispersant (hereinafter abbreviated as "YD"), which is the derivative of the yellow pigment, was used.

TABLE 1

Compositions of Examples 1–10 and Comparative Examples 1–3
(each value indicates the number of "parts")

| | Example | | | | | | | | | |
|---|---|---|---|---|---|---|---|---|---|---|
| | 1 | 2 | 3 | 4 | 5 | 6 | 7 | 8 | 9 | 10 |
| Hue | G | G | G | R | R | R | R | Y | Y | Y |

TABLE 1-continued

Compositions of Examples 1–10
and Comparative Examples 1–3
(each value indicates the number of "parts")

| | | | | | | | | | | |
|---|---|---|---|---|---|---|---|---|---|---|
| P.G. 36 | 20 | 20 | 20 | — | — | — | — | — | — | — |
| P.R. 177 | — | — | — | 20 | 20 | 20 | 20 | — | — | — |
| P.Y. 139 | — | — | — | — | — | — | — | 20 | 20 | 20 |
| Dispersant | 2 | 2 | 2 | 2 | 2 | 2 | 2 | 2 | 2 | 2 |
| Acrylic resin | 50 | 50 | 50 | 50 | 50 | 50 | 50 | 50 | 50 | 50 |
| PGMAc | 28 | 28 | 28 | 28 | 28 | 28 | 28 | 28 | 28 | 28 |
| Total | 100 | 100 | 100 | 100 | 100 | 100 | 100 | 100 | 100 | 100 |

| | Comparative Example | | |
|---|---|---|---|
| | 1 | 2 | 3 |
| Hue | G | R | Y |
| Pigment | 20 | 20 | 20 |
| | (P.G. 36) | (P.R. 177) | (P.Y. 139) |
| Dispersant | 2 (BD) | 2 (YD) | 2 (YD) |
| Acrylic resin | 50 | 50 | 50 |
| PGMAc | 28 | 28 | 28 |
| Total | 100 | 100 | 100 |

EXAMPLE 11

The base colors of Examples 1–10 and Comparative Examples 1–3 were coated on glass substrates by a spinner, respectively. After drying, the maximum transmittance and maximum absorption wavelength of each coating were measured. Further, the base colors were stored at room temperature for one month, and their viscosity changes were measured. The results are shown in Table 2. Concerning the maximum transmittance of each of the red colors and yellow colors, the value shown in the table is the half of its transmittance at a wavelength of 650 nm.

Compared with the green base color of Comparative Example 1, the green base colors obtained in Examples 1–3 were shifted toward a longer wavelength side in maximum transmission wavelength, and were lower in viscosity. The red base colors of Examples 4–7 and the yellow base colors of Examples 8–10 were significantly lower in viscosity, although there was no substantial difference in hue.

EXAMPLE 12

For the production of an RGB color filter, photosensitive R, G and B pigment dispersions were obtained in accordance with the corresponding compositions shown below in Table

TABLE 2

Light Transmission Characteristics and Storage Stability
of Examples 1–10 and Comparative Examples 1–3

| | | Example | | | | | | |
|---|---|---|---|---|---|---|---|---|
| | | 1 | 2 | 3 | 4 | 5 | 6 | 7 |
| Hue | | G | G | G | R | R | R | R |
| Maximum absorption wavelength, nm | | 540 | 540 | 540 | 600 | 598 | 598 | 599 |
| Maximum transmittance, % | | 90.5 | 91.5 | 90.8 | 47.2 | 47.2 | 47.1 | 47.4 |
| Viscosity cp | Initial | 34 | 42 | 31 | 37 | 39 | 31 | 43 |
| | One month later | 52 | 45 | 44 | 46 | 59 | 48 | 61 |

| | | Example | | | Comparative Example | | |
|---|---|---|---|---|---|---|---|
| | | 8 | 9 | 10 | 1 | 2 | 3 |
| Hue | | Y | Y | Y | G | R | Y |
| Maximum absorption wavelength, nm | | 520 | 521 | 520 | 530 | 597 | 524 |
| Maximum transmittance, % | | 46.4 | 46.0 | 46.1 | 92.8 | 46.6 | 46.0 |
| Viscosity cp | Initial | 50 | 48 | 42 | 61 | 89 | 62 |
| | One month later | 63 | 69 | 62 | 83 | 103 | 194 |

3. The blue base color was prepared by using Cyanine Blue P.B. 15:6 and a commercially-available derivative of phthalocyanine blue as a dispersant (abbreviated as "BD") in place of the cyanine green in Comparative Example 1.

TABLE 3

Compositions of Photosensitive
R, G and B Pigment Dispersions
(each value indicates the number of "parts")

|  | R | G | B |
|---|---|---|---|
| R base color of Example 4 | 75 | — | — |
| G base color of Example 1 | — | 85 | — |
| Y base color of Example 8 | 25 | 15 | — |
| Blue base color | — | — | 100 |
| Acrylic resin | 50 | 50 | 50 |
| Trimethylolpropane acrylate | 10 | 10 | 10 |
| 2-Hydroxy-2-methylpropylphenone | 2 | 2 | 2 |
| 2,2-Diethoxyacetophenone | 1 | 1 | 1 |
| PGMAc | 37 | 37 | 37 |
| Total | 200 | 200 | 200 |

A glass substrate, which had been treated with a silane coupling agent, was mounted on a spin coater, on which the above photosensitive resin solution for the red (R) color filter was spin-coated first at 300 rpm for 5 seconds and then at 1,200 rpm for 5 seconds. The thus-coated glass substrate was next prebaked at 80° C. for 10 minutes. A photomask of a mosaic pattern was brought into close contact with the prebaked coating, followed by exposure at a light quantity of 100 mJ/cm$^2$ under an extra-high pressure mercury vapor lamp. Development and washing were next conducted with an exclusive developer and an exclusive rinse, respectively, whereby a red mosaic pattern was formed on the glass substrate.

A green mosaic pattern and a blue mosaic pattern were then formed from the above-described photosensitive resin solutions for the green (G) color filter and the blue (B) color filter, respectively, by conducting coating and baking in a similar manner as the above-described methods. so that an RGB color filter was obtained. The color filter so obtained had excellent spectral curve characteristics, was excellent in fastness such as light fastness and heat resistance, had excellent properties in light transmission too, and was equipped with superb properties as a color filter for use in a liquid crystal color display.

EXAMPLE 13

In accordance with the corresponding composition shown below in Table 4, a red base color was obtained in a similar manner as in Example 1 except that Dispersant 9 was used in place of Dispersant 1.

EXAMPLES 14–16

In accordance with the corresponding compositions shown below in Table 4, three red base colors were obtained in a similar manner as in Example 1 except that Dispersant 10 (Example 14), Dispersant 11 (Example 15) and Dispersant 12 (Example 16) were used in place of Dispersant 1.

EXAMPLES 17–20

Four blue base colors were obtained by similar procedures as in Example 1 except that P.V. 23 was used instead of P.R. 177 and Dispersant 13 (Example 17), Dispersant 14 (Example 18), Dispersant 15 (Example 19) and Dispersant 16 (Example 20) were used as dispersants.

EXAMPLE 21

A purple base color was obtained by similar procedures as in Example 1 except that P.V. 23 was used instead of P.R. 177 and Dispersant 2 was used as a dispersant. Its composition is shown in Table 4. This purple base color is used as a complementary color for a blue color upon production of a color filter.

EXAMPLE 22

A yellow base color was obtained by similar procedures as in Example 1 except that P.Y. 13& was used instead of P.R. 177 and Dispersant 10 was used as a dispersant. Its composition is shown in Table 4. This yellow base color is used as a complementary color for a red color and a green color upon production of a color filter.

EXAMPLE 23

A green base color was obtained by similar procedures as in Example 1 except that P.G. 36 was used instead of P.R. 177 and Dispersant 1 was used as a dispersant. Its composition is shown in Table 4.

Comparative Example 4

In accordance with the corresponding composition shown below in Table 4, a red base color was obtained in a similar manner as in Example 13 except that a commercial dispersant (hereinafter abbreviated as "RD"), which is a derivative of a red pigment, was used.

Comparative Example 5

In accordance with the corresponding composition shown below in Table 4, a blue base color was obtained in a similar manner as in Example 17 except that a commercial dispersant (hereinafter abbreviated as "BD"), which is a derivative of a blue pigment, was used.

Comparative Example 6

In accordance with the corresponding composition shown below in Table 4, a purple base color was obtained in a similar manner as in Example 21 except that a commercial dispersant (hereinafter abbreviated as "VD"), which is a derivative of a purple pigment, was used.

Comparative Example 7

In accordance with the corresponding composition shown below in Table 4, a yellow base color was obtained in a similar manner as in Example 22 except that a commercial dispersant (hereinafter abbreviated as "YD"), which is a derivative of a yellow pigment, was used.

TABLE 4

Compositions of Examples 13–23
and Comparative Examples 4–7
(each value indicates the number of "parts")

| | Example | | | | | | | | | | |
|---|---|---|---|---|---|---|---|---|---|---|---|
| | 13 | 14 | 15 | 16 | 17 | 18 | 19 | 20 | 21 | 22 | 23 |
| Hue | R | R | R | R | B | B | B | B | V | Y | G |
| P.R. 177 | 20 | 20 | 20 | 20 | — | — | — | — | — | — | — |
| P.B. 15:6 | — | — | — | — | 20 | 20 | 20 | 20 | — | — | — |
| P.V. 23 | — | — | — | — | — | — | — | — | 20 | — | — |
| P.Y. 138 | — | — | — | — | — | — | — | — | — | 20 | — |
| P.G. 36 | — | — | — | — | — | — | — | — | — | — | 20 |
| Dispersant | 2 | 2 | 2 | 2 | 2 | 2 | 2 | 2 | 2 | 2 | 2 |
| Acrylic resin | 50 | 50 | 50 | 50 | 50 | 50 | 50 | 50 | 50 | 50 | 50 |
| PGMAc | 28 | 28 | 28 | 28 | 28 | 28 | 28 | 28 | 28 | 28 | 28 |
| Total | 100 | 100 | 100 | 100 | 100 | 100 | 100 | 100 | 100 | 100 | 100 |

| | Comparative Example | | | |
|---|---|---|---|---|
| | 4 | 5 | 6 | 7 |
| Hue | R | B | V | Y |
| Pigment | 20 | 20 | 20 | 20 |
| | (P.R. 177) | (P.B. 15:6) | (P.V. 23) | (P.Y. 138) |
| Dispersant | 2 | 2 | 2 | 2 |
| | (RD) | (BD) | (VD) | (YD) |
| Acrylic resin | 50 | 50 | 50 | 50 |
| PGMAc | 28 | 28 | 28 | 28 |
| Total | 100 | 100 | 100 | 100 |

EXAMPLE 24

The base colors of Examples 13–23 and Comparative Examples 4–7 were coated on glass substrates by a spinner, respectively. After drying, the maximum transmittance and maximum absorption wavelength of each coating were measured. Further, the base colors were stored at room temperature for one month, and their viscosity changes were measured. The results are shown in Table 5. Concerning the maximum transmittance of each of the red colors and yellow colors, the value shown in the table is the half of its transmittance at a wavelength of 650 nm.

TABLE 5

Light Transmission Characteristics and Storage Stability
of Examples 13–23 and Comparative Examples 4–7

| | | Example | | | | | | |
|---|---|---|---|---|---|---|---|---|
| | | 13 | 14 | 15 | 16 | 17 | 18 | 19 |
| Hue | | R | R | R | R | B | B | B |
| Maximum absorption wavelength, nm | | 605 | 605 | 605 | 606 | 460 | 461 | 460 |
| Maximum transmittance, % | | 48.2 | 48.2 | 48.0 | 48.2 | 90.1 | 90.5 | 89.6 |
| Viscosity cp | Initial | 37 | 40 | 32 | 43 | 36 | 41 | 32 |
| | One month later | 51 | 57 | 42 | 60 | 52 | 48 | 41 |

| | | Example | | | |
|---|---|---|---|---|---|
| | | 20 | 21 | 22 | 23 |
| Hue | | B | V | Y | G |
| Maximum absorption wavelength, nm | | 460 | 437 | 529 | 540 |
| Maximum transmittance, % | | 89.0 | 66.5 | 46.5 | 90.5 |
| Viscosity cp | Initial | 48 | 41 | 27 | 34 |
| | One month | 59 | 55 | 39 | 52 |

TABLE 5-continued

Light Transmission Characteristics and Storage Stability
of Examples 13–23 and Comparative Examples 4–7 later

|  |  | Comparative Example |  |  |  |
|---|---|---|---|---|---|
|  |  | 4 | 5 | 6 | 7 |
| Hue |  | R | B | V | Y |
| Maximum absorption wavelength, nm |  | 597 | 460 | 437 | 524 |
| Maximum transmittance, % |  | 46.6 | 90.3 | 66.5 | 46.0 |
| Viscosity cp | Initial | 89 | 72 | 80.0 | 62 |
|  | One month later | 103 | 98 | 130 | 194 |

EXAMPLE 25

For the production of an RGB color filter, photosensitive R, G and B pigment dispersions were obtained in accordance with the corresponding compositions shown below in Table 6.

TABLE 6

Compositions of Photosensitive
R, G and B Pigment Dispersions
(each value indicates the number of "parts")

|  | R | G | B |
|---|---|---|---|
| R base color of Example 13 | 75 | — | — |
| B base color of Example 17 | — | — | 95 |
| V base color of Example 21 | — | — | 5 |
| Y base color of Example 22 | 25 | 15 | — |
| G base color of Example 23 | — | 85 | — |
| Acrylic resin | 50 | 50 | 50 |
| Trimethylolpropane acrylate | 10 | 10 | 10 |
| 2-Hydroxy-2-methylpropylphenone | 2 | 2 | 2 |
| 2,2-Diethoxyacetophenone | 1 | 1 | 1 |
| PGMAc | 37 | 37 | 37 |
| Total | 200 | 200 | 200 |

A glass substrate, which had been treated with a silane coupling agent, was mounted on a spin coater, on which the above photosensitive resin solution for the red (R) color filter was spin-coated first at 300 rpm for 5 seconds and then at 1,200 rpm for 5 seconds. The thus-coated glass substrate was next prebaked at 80° C. for 10 minutes. A photomask of a mosaic pattern was brought into close contact with the prebaked coating, followed by exposure at a light quantity of 100 mJ/cm² under an extra-high pressure mercury vapor lamp. Development and washing were next conducted with an exclusive developer and an exclusive rinse, respectively, whereby a red mosaic pattern was formed on the glass substrate.

A green mosaic pattern and a blue mosaic pattern were then formed from the above-described photosensitive resin solutions for the green (G) color filter and the blue (B) color filter, respectively, by conducting coating and baking in a similar manner as the above-described methods. so that an RGB color filter was obtained. The color filter so obtained had excellent spectral curve characteristics, was excellent in fastness such as light fastness and heat resistance, had excellent properties in light transmission too, and was equipped with superb properties as a color filter for use in a liquid crystal color display.

This application claims the priority of Japanese Patent Application No. HEI 10-371915 filed Dec. 28, 1998, which is incorporated herein by reference.

What is claimed is:

1. A pigment dispersion for a color filter, said pigment dispersion being composed of a pigment, a dispersant, a film-forming resin and a liquid medium, wherein said dispersant comprises a compound represented by the following formula (I):

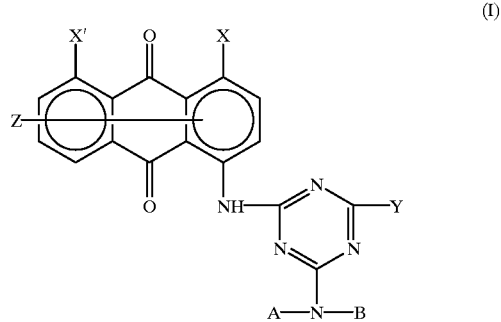

wherein X and X' each independently represent a hydrogen atom, a hydroxyl group, an alkoxy group, a primary, secondary or tertiary amino group, or an acylamino group; Y represents an anthraquinonylamino, phenylamino or phenoxy group, wherein said phenylamino and phenoxy have a hydrogen atom, a hydroxyl group, an alkoxy group, a primary, secondary or tertiary amino group, or an acylamino group at the 4-position or 5-position thereof; A and B each independently represent an alkyl group, a cycloalkyl group or an aryl group, and at least one of A and B has at least one substituent group containing a basic nitrogen atom; and Z represents a hydrogen atom, a cyano group, a halogen atom, an alkyl group, an alkoxy group, a nitro group, a benzoylamino group or a 3-benzoyl group, and said 3-benzoyl group may be fused together with X to form an acridone ring.

2. A pigment dispersion according to claim 1, wherein said at least one substituent group containing said basic nitrogen atom is a primary, secondary or tertiary amino group, a quaternary ammonium group or a pyridinium group; and, when two or more substituent groups each of which contains said basic nitrogen group exist, said two or more substituent groups may be the same or different.

3. A pigment dispersion according to claim 1, wherein said compound represented by the formula (I) is represented by the following formula (1):

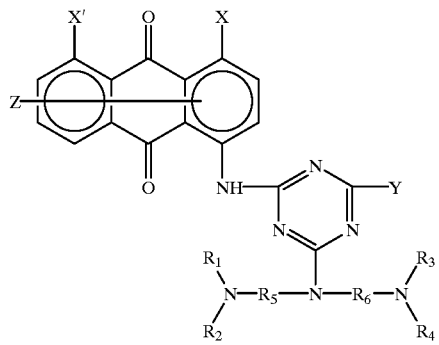

(1)

wherein X, X', Y and Z have the same meanings as defined above; $R_1$ to $R_4$ may be the same or different and each independently represent a substituted or unsubstituted alkyl or cycloalkyl group, and $R_1$ and $R_2$ and/or $R_3$ and $R_4$ may be fused together with the adjacent nitrogen atom thereof to form a heterocyclic ring which may additionally contain a further nitrogen atom, an oxygen atom or a sulfur atom; and $R_5$ and $R_6$ each independently represent an alkylene group, a cycloalkylene group or an arylene group.

4. A pigment dispersion according to claim 1, wherein said compound represented by the formula (I) is represented by the following formula (2):

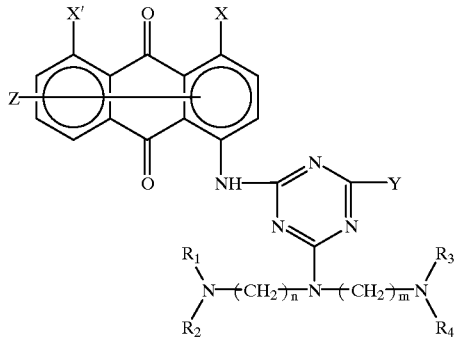

(2)

wherein X, X', Y and Z have the same meanings as defined above; $R_1$ to $R_4$ may be the same or different and each independently represent a substituted or unsubstituted alkyl or cycloalkyl group, and $R_1$ and $R_2$ and/or $R_3$ and $R_4$ may be fused together with the adjacent nitrogen atom thereof to form a heterocyclic ring which may additionally contain a further nitrogen atom, an oxygen atom or a sulfur atom; and n and m each independently stand for an integer of from 2 to 30.

5. A color dispersion according to claim 1, wherein said compound represented by the formula (I) is represented by the following formula (3):

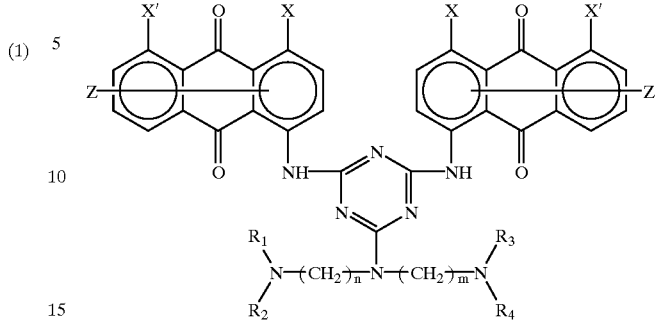

(3)

wherein X and X' each independently represent a hydrogen atom or a benzoylamino group; Z represents a hydrogen atom; $R_1$ to $R_4$ may be the same or different and each independently represent a methyl group or an ethyl group; and n and m each independently stand for 2 or 3.

6. A pigment dispersion according to claim 1, wherein said pigment is a red pigment, a blue pigment, a green pigment, a yellow pigment, a purple pigment, or a black pigment.

7. A pigment dispersion according to claim 1, wherein said dispersant is contained in a proportion of from 0.5 to 50 parts by weight per 100 parts by weight of the pigment.

8. A pigment dispersion according to claim 1, wherein said pigment is contained in a proportion of from 5 to 500 parts by weight per 100 parts by weight of said film-forming resin.

9. A pigment dispersion according to claim 1, wherein said film-forming resin comprises a photosensitive resin.

10. A pigment dispersion according to claim 1, wherein said photosensitive resin is an alkali-developable acrylate resin which contains free carboxyl radicals in a molecule thereof.

11. A pigment dispersion according to claim 1, wherein said pigment is a red pigment, a blue pigment, a green pigment, a yellow pigment, a purple pigment or a black pigment, said dispersant is a compound represented by the below-described formula (3), and said film-forming resin is an alkali-developable acrylate resin which contains free carboxyl radicals in a molecule thereof:

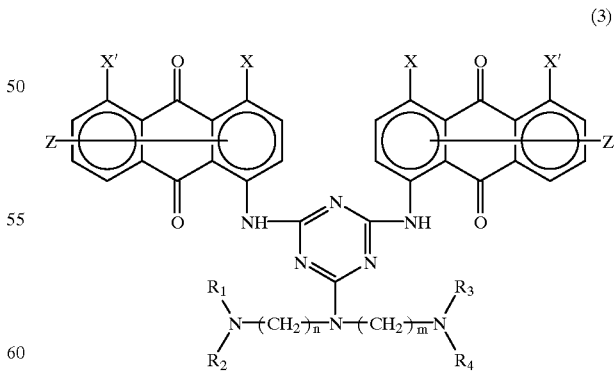

(3)

wherein X and X' each independently represent a hydrogen atom or a benzoylamino group; z represents a hydrogen atom; $R_1$ to $R_4$ may be the same or different and each independently represent a methyl group or an ethyl group; and n and m each independently stand for 2 or 3.

12. A process for the production of a color filter, comprising: forming a color pattern on a color filter substrate using a pigment dispersion as defined in any one of claims 1–11.

13. A color filter produced by a process as defined in claim 12.

* * * * *

UNITED STATES PATENT AND TRADEMARK OFFICE
CERTIFICATE OF CORRECTION

PATENT NO. : 6,302,953 B1  Page 1 of 1
DATED : October 16, 2001
INVENTOR(S) : Saikatsu et al.

It is certified that error appears in the above-identified patent and that said Letters Patent is hereby corrected as shown below:

<u>Title page,</u>
Item [73], the Assignee should read:
-- [73] Assignee: Dainichiseika Color & Chemicals Mfg. Co. Ltd., Tokyo (JP) --

Signed and Sealed this

Fourth Day of June, 2002

*Attest:*

JAMES E. ROGAN
*Attesting Officer*    *Director of the United States Patent and Trademark Office*